(No Model.)

L. MORITZ.
COUPLING DEVICE FOR SAFE SPINDLES.

No. 269,953. Patented Jan. 2, 1883.

Inventor.
Leopoldt Moritz
by James H. Layman
Atty.

Attest.

UNITED STATES PATENT OFFICE.

LEOPOLDT MORITZ, OF NEWPORT, KENTUCKY, ASSIGNOR TO THE MOSLER, BAHMANN & CO., OF CINCINNATI, OHIO.

COUPLING DEVICE FOR SAFE-SPINDLES.

SPECIFICATION forming part of Letters Patent No. 269,953, dated January 2, 1883.

Application filed September 2, 1882. (No model.)

*To all whom it may concern:*

Be it known that I, LEOPOLDT MORITZ, a citizen of the United States, residing at Newport, in the county of Campbell and State of Kentucky, have invented certain new and useful Improvements in Bank-Safes, of which the following is a specification.

My invention consists in applying a peculiarly-constructed coupling device to the inner end of a bank-safe spindle, said device being so arranged as to allow the spindle to be turned uninterruptedly either to the right or left when the main bolt and the train-bolts are shot, and without affecting any of the locking mechanism, while the retraction of the main bolt causes the coupling device to engage with said spindle, in order that the train-bolts may be withdrawn from their sockets in the safe-door frame.

The coupling device consists essentially of a hub mounted on but not attached to the spindle, and having a suitable connection with the train-bolts, said hub being recessed to receive a slide provided with a slot terminating with an enlargement or eye. Furthermore, this slide is notched near one end to receive a dog projecting from the main bolt, in order that the retraction of this bolt may cause the slot of the slide to engage with a "square" of the spindle, and thereby temporarily lock the latter to the hub and allow the train-bolts to be withdrawn, as hereinafter more fully described, and pointed out in the claims.

Figure 1:
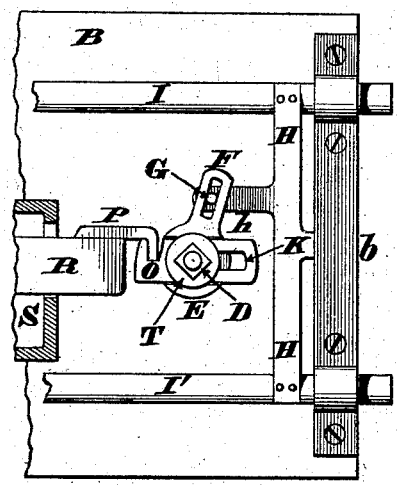
Figure 5:
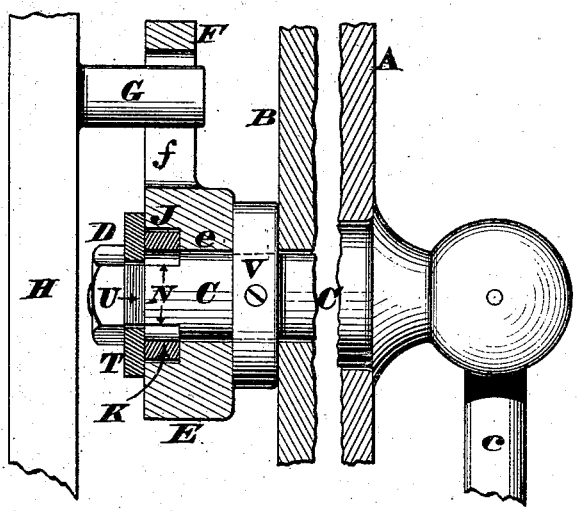
Figure 2:
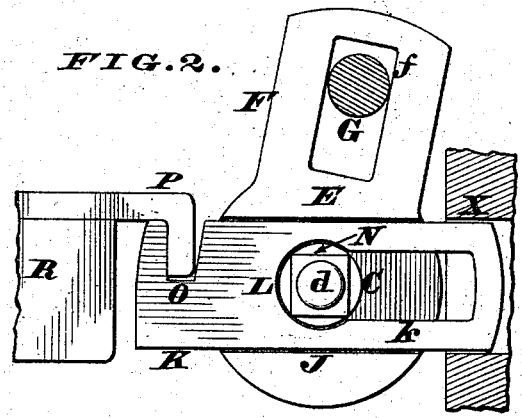
Figure 3:
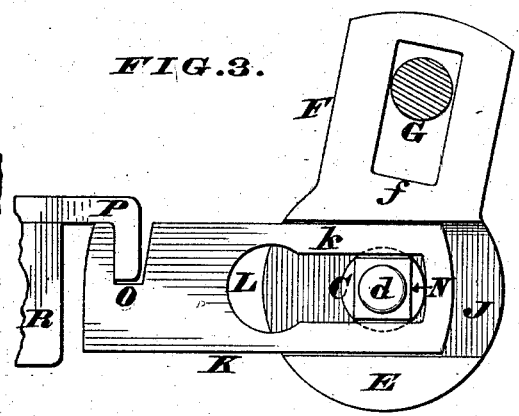
Figure 4:
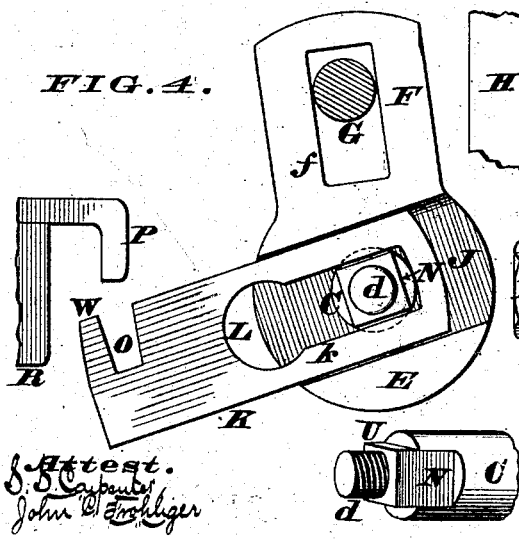
Figure 6:
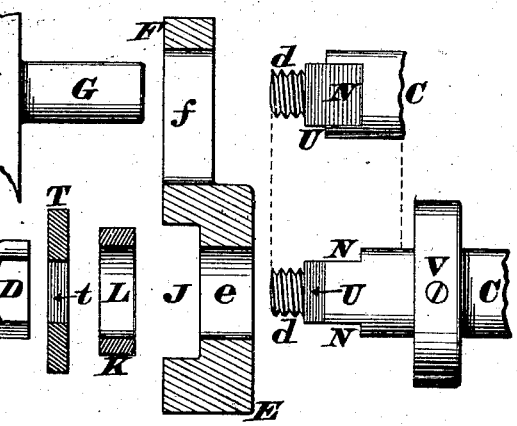

In the annexed drawings, Figure 1 is an elevation of the inner side of a safe-door provided with my improvements, the bolts being shown protruded. Fig. 2 is an enlarged elevation of the coupling device in the same position as seen in the preceding illustration, the stump that communicates motion to the train-bolts being in section. Fig. 3 is a similar elevation, but showing the main bolt retracted and the slide engaged with the square of the spindle. Fig. 4 is an elevation showing the now coupled spindle, hub, and slide turned so as to unlock the train-bolts. Fig. 5 is a vertical section of the device, the various members of the same being in the same position as seen in Figs. 1 and 2, and the central portion of the spindle being omitted. Fig. 6 is a vertical section of the various members of the coupling device detached from each other. In the above views the washer is omitted from Figs. 2, 3, and 4.

Referring to Fig. 5, A and B represent, respectively, the outer and inner plates of a safe-door of any desired thickness, said door being traversed by a customary spindle, C, having an external lever-handle, c. The extreme inner end of this spindle is threaded at $d$ to receive a nut, D, wherewith the coupling device is secured in position on said spindle. The principal member of this coupling is a hub, E, provided with an axial bore, $e$, adapted to turn freely on spindle C, said hub being further provided with a projecting lug, F, slotted at $f$ to receive a stump, G, that communicates motion to the train-bolt mechanism. In Fig. 1 this stump is shown as attached to a lateral projection, $h$, of the tie-bar H, that connects the train-bolts I I', said projection being represented as located between the lug F and plate B; but in Fig. 5 the stump G is shown projecting from the tie-bar H, thereby indicating that said stump may be connected either directly or indirectly to the bolt-shifting mechanism. The inner face of hub E is recessed at J to receive the reciprocating slide K, the latter being provided with a longitudinal slot, $k$, terminating at one end with an eye or enlargement, L. This slot is of such a width as to receive the square N of spindle C, while the diameter of the eye L is a little greater than that of the spindle in order that the latter may turn freely therein. Furthermore, the slide is notched at O to receive a hook-shaped dog, P, projecting from the main bolt R of the combination or other bank-lock S.

T is a washer that retains the slide K $k$ L within the recess J, said washer having a non-circular eye, $t$, that fits over the shorter portion U of the square of spindle C.

V is a fixed collar on spindle C for the hub E to bear against.

X is a socket that supports the protruded end of slide K, which socket may be made in the bolt-bar $b$ when practicable; or said socket may be secured to the plate B of the safe-door. When the train-bolts I I' are thrown, as seen in Fig. 1, and the main bolt R is shot from lock S, the slide K is advanced so far as to bring its eye L over the spindle C, and as said eye is of somewhat greater diameter than said spindle it is evident the latter can be turned in either direction by the lever c without communicating motion to the hub E. (See Fig. 2.) Consequently said lever can be turned either to the right or left for an indefinite period of time without in the least affecting the position of the train-bolts or otherwise interfering with the locking mechanism of the safe. As soon, however, as the main bolt R is retracted, its dog P drags the slide K back a corresponding distance, and thereby engages the slot $k$ with the square N of the spindle, as seen in Fig. 3. Evidently the hub, slide, and spindle are now temporarily locked or coupled together, and by simply turning lever c in the proper direction to retract the train-bolts I I', the free end of slide K swings down and disengages its notch O from the dog P, as seen in Fig. 4. When the safe is to be locked the handle c is turned, so as to force the train-bolts I I' into their appropriate sockets, which turning of said handle restores slide K to its normal position and causes the dog P to engage with notch O. As soon as the main bolt R is shot the slide is again advanced, so as to bring its eye N over the spindle C, thereby disconnecting all of the coupling devices and allowing the spindle C to be turned without affecting any of the locking mechanism of the safe.

The above is a description of the preferred form of my coupling device; but it is evident the details of the same may be considerably modified without deviating from the leading principle of the invention—as, for example, the hook-shaped termination W (seen in Fig. 4 at the end of slide K) may be arranged to engage with a notch in the lower edge of bolt R, thereby dispensing with dog P; or the disengagement of bolt R from slide K may be effected by turning the latter up instead of down; but as this arrangement would necessitate the swinging of lever c in the wrong direction, such an alteration is discouraged. Again, the tie-plate H may be connected to lug F with a link, or the upper end of said lug may take the shape of a segmental gear adapted to engage with a rack on the under side of the lateral extension $h$ of said plate, or of any suitable attachment thereto. Finally, the upper and lower sides of recess J may be undercut, and the edges of slide K be beveled so as to dovetail therein, by which arrangement the screw $d$, nut D, square U, and washer T $t$ would be dispensed with.

I claim as my invention—

The combination of squared spindle C N, recessed hub E $e$ J, lug F, slotted and notched slide K $k$ L O, main bolt R, and dog P, said lug F being adapted to communicate motion to the train-bolts, substantially as herein described.

In testimony whereof I affix my signature in presence of two witnesses.

LEOPOLDT MORITZ.

Witnesses:
JAMES H. LAYMAN,
GEORGE J. H. GOEHLER.